(12) United States Patent
Miziolek

(10) Patent No.: US 11,978,087 B2
(45) Date of Patent: May 7, 2024

(54) USING A GENETIC ALGORITHM TO IDENTIFY A BALANCED ASSIGNMENT OF ONLINE SYSTEM USERS TO A CONTROL GROUP AND A TEST GROUP FOR PERFORMING A TEST

(71) Applicant: Maplebear Inc., San Francisco, CA (US)

(72) Inventor: Konrad Gustav Miziolek, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/897,049

(22) Filed: Aug. 26, 2022

(65) Prior Publication Data

US 2024/0070715 A1 Feb. 29, 2024

(51) Int. Cl.
*G06Q 30/02* (2023.01)
*G06N 3/126* (2023.01)
*G06Q 30/0242* (2023.01)

(52) U.S. Cl.
CPC ......... *G06Q 30/0243* (2013.01); *G06N 3/126* (2013.01)

(58) Field of Classification Search
CPC .................. G06Q 30/0243; G06N 3/126
See application file for complete search history.

(56) References Cited

U.S. PATENT DOCUMENTS

| | | | |
|---|---|---|---|
| 2009/0030859 A1 | 1/2009 | Buchs et al. | |
| 2013/0282626 A1 | 10/2013 | White et al. | |
| 2016/0098643 A1* | 4/2016 | Tsomokos | H04L 67/02 706/11 |
| 2016/0253696 A1* | 9/2016 | Gui | G06Q 30/0243 705/14.42 |
| 2017/0192638 A1 | 7/2017 | Iscoe et al. | |
| 2018/0253649 A1 | 9/2018 | Miikkulainen et al. | |
| 2020/0104340 A1* | 4/2020 | Liu | G06F 9/4812 |

(Continued)

OTHER PUBLICATIONS

Towards Automated A/B Testing (NPL: Tamburelli Towards Automated A/B Testing (pp. 1-16 (Year: 2014).*

(Continued)

*Primary Examiner* — Breffni Baggot
(74) *Attorney, Agent, or Firm* — Fenwick & West LLP

(57) ABSTRACT

An online system generates a set of genomic representations, each including multiple genes, in which each gene represents users assigned to a control or test group for performing a test. A metric is identified based on a treatment associated with the test group and a score for each representation is computed based on a difference between two values, in which each value is based on the metric associated with users assigned to the test or control group. A propagation process is executed by identifying representations having at least a threshold score, propagating genes included in the representations to an additional set of representations through recombination and/or mutation, and computing the score for each additional representation. The propagation process is repeated for each additional set of representations until stopping criteria are met and a representation is selected based on scores associated with one or more representations.

20 Claims, 7 Drawing Sheets

(56) References Cited

U.S. PATENT DOCUMENTS

2021/0365969 A1* 11/2021 Lieu .................. G06Q 30/0201
2022/0180391 A1   6/2022 Prakash et al.

OTHER PUBLICATIONS

University of Chicago, A/B Testing with Fat Tails, J of Political Economy vol. 127 No. 12 (Year: 2020).*
University of Chicago, Genetic Algorithm: UChicago meals and the knapsack problem (Year: 2015).*
Saint-Jacques, G. "Building inclusive products through A/B testing," LinkedIn Engineering, Mar. 31, 2020, 8 pages, Retrieved from the internet <URL:https://engineering.linkedin.com/blog/2020/building-inclusive-products-through-a-b-testing>.
PCT International Search Report and Written Opinion, PCT Application No. PCT/US2023/025890, Oct. 19, 2023, 14 pages.

* cited by examiner

USING A GENETIC ALGORITHM TO IDENTIFY A BALANCED ASSIGNMENT OF ONLINE SYSTEM USERS TO A CONTROL GROUP AND A TEST GROUP FOR PERFORMING A TEST

BACKGROUND

This disclosure relates generally to assigning online system users to control and test groups for performing a test and more specifically to computer hardware and software for using a genetic algorithm to identify a balanced assignment of online system users to control and test groups for performing a test.

Online systems often perform A/B tests to compare the effects of different versions of variables or "treatments" on their users, in which the effects are associated with goals of the online systems (e.g., to maximize growth, to minimize cost, etc.). In its simplest form, each online system user participating in an A/B test is assigned to a control group or a test group and a treatment being tested is applied to the test group, but not to the control group. An effect of an absence of the treatment on the control group is measured to establish a baseline with which an effect of the treatment on the test group is compared, allowing the effect of the treatment to be evaluated while minimizing effects of other variables. For example, an online system, such as an online concierge system, may perform an A/B test to compare the effects of different pay rates for shoppers on the rate the shoppers accept batches of orders for fulfillment. In this example, effects of the treatment (i.e., a new pay rate) and the absence of the treatment (i.e., the original pay rate) are measured as the average rates orders are accepted for fulfillment by the shoppers in the test group and the control group, respectively, which are then compared to each other.

When performing an A/B test, it is important that online system users are divided evenly among the control and test groups and that users assigned to each group are representative of the entire population of users to accurately measure various metrics from which conclusions may be drawn. Although an approach for achieving this is to use a random sampling technique that randomly assigns each user to a group, there is always a chance that the groups may still be imbalanced (e.g., users in one group may be disproportionately older and earn higher incomes than users in another group). While some methodologies (e.g., stratified sampling, rerandomization, and controlling for covariates) may improve the balance among groups in an A/B test, they do not account for "network effects" of treatments on users other than those to whom the treatments are applied. For example, if an online concierge system is testing a treatment that shortens the estimated delivery time for an order placed by a first customer in a treatment group, since there are a limited number of shoppers available to fulfill orders in a given area, this treatment may increase the estimated delivery time for another order placed by a second customer in the same area even if the second customer is in a control group.

To account for network effects of treatments being tested, rather than performing a user-level A/B test that assigns individual online system users to test or control groups, a market-level A/B test may be performed by assigning units of online system users to test or control groups, in which each unit corresponds to online system users in a market (e.g., a zip code, a city, a region, a state, a country, etc.). However, since market-level A/B tests reduce the sample size on which the tests are performed, the confidence intervals for the results of the tests are widened, making it difficult to obtain reliable results, especially if the magnitude of the effects of the treatments being tested are small. The same is true for user-level A/B tests performed on a small sample of online system users in order to limit exposure of users to the treatments being tested (e.g., new pricing schemes). Although one solution to this problem is to perform the tests for longer periods of time, doing so may be time-consuming, labor intensive, and/or costly.

SUMMARY

To design balanced experiments for both user-level and market-level tests without having to perform the tests for longer periods of time to obtain reliable results, an online system uses a genetic algorithm to identify a balanced assignment of online system users to control and test groups for performing a test (e.g., an A/B test), in accordance with one or more aspects of the disclosure. More specifically, the online system generates a set of genomic representations that each include multiple genes, in which each gene represents one or more online system users assigned to a control group or a test group for performing the test. The online system identifies a metric based on a treatment associated with the test group and computes a score for each genomic representation based on a difference between two values, in which each value is based on the metric associated with users assigned to the test or control group. The online system executes a propagation process by identifying one or more genomic representations having at least a threshold score, propagating one or more genes included in the identified genomic representation(s) to an additional set of genomic representations through recombination and/or mutation, and computing the score for each genomic representation included among the additional set of genomic representations. The online system repeats the propagation process for each additional set of genomic representations until a set of stopping criteria is met. The online system then selects a genomic representation based on one or more scores associated with one or more genomic representations. The online system may then assign online system users to the test or control group based on the selected genomic representation, perform the test based on the assignment, and/or analyze a result of performing the test.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Architecture

Figure 1:
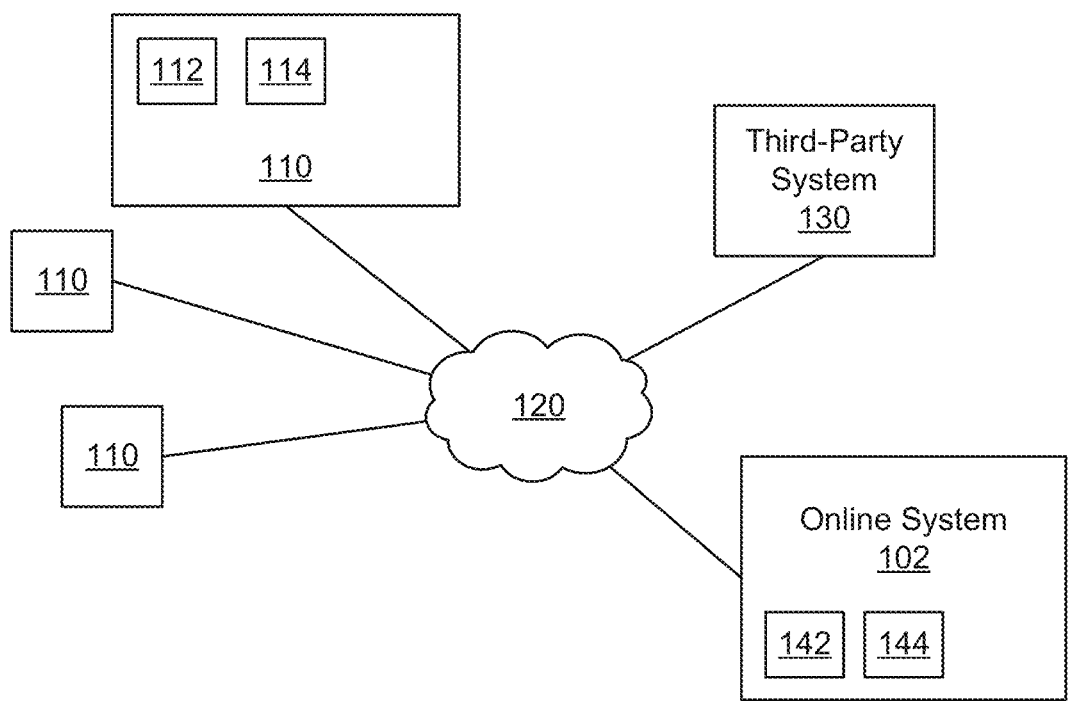
FIG. 1 is a block diagram of a system environment in which an online system, such as an online concierge system, operates, according to one or more embodiments.

FIG. 1 is a block diagram of a system environment 100 in which an online system (e.g., an online concierge system) 102, as further described below in conjunction with FIGS. 2 and 3, operates. The system environment 100 shown in FIG. 1 comprises one or more client devices 110, a network 120, one or more third-party systems 130, and the online system 102. In alternative configurations, different and/or additional components may be included in the system environment 100. Additionally, in other embodiments, the online system 102 may be configured to retrieve content for display to users and to transmit the content to one or more client devices 110 for display.

The client devices 110 are one or more computing devices capable of receiving user input as well as transmitting and/or receiving data via the network 120. In one or more embodiments, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one or more embodiments, a client device 110 executes an application allowing a user of the client device 110 to interact with the online system 102. For example, the client device 110 executes a customer mobile application 206 or a shopper mobile application 212 to enable interaction between the client device 110 and the online system 102. As an additional example, a client device 110 executes a browser application to enable interaction between the client device 110 and the online system 102 via the network 120. In another embodiment, a client device 110 interacts with the online system 102 through an application programming interface (API) running on a native operating system of the client device 110, such as IOS® or ANDROID™.

A client device 110 includes one or more processors 112 configured to control operation of the client device 110 by performing various functions. In various embodiments, a client device 110 includes a memory 114 comprising a non-transitory storage medium on which instructions are encoded. The memory 114 may have instructions encoded thereon that, when executed by the processor 112, cause the processor 112 to perform functions to execute the customer mobile application 206 or the shopper mobile application 212.

The client devices 110 are configured to communicate via the network 120, which may comprise any combination of local area and/or wide area networks, using both wired and/or wireless communication systems. In one or more embodiments, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 102 or with the client device(s) 110. In one or more embodiments, a third-party system 130 is an application provider communicating information describing applications for execution by a client device 110 or communicating data to client devices 110 for use by an application executing on the client device 110. In other embodiments, a third-party system 130 provides content or other information for presentation via a client device 110. For example, a third-party system 130 stores one or more web pages and transmits the web pages to a client device 110 or to the online system 102. A third-party system 130 may also communicate information to the online system 102, such as advertisements, content, or information about an application provided by the third-party system 130.

The online system 102 includes one or more processors 142 configured to control operation of the online system 102 by performing various functions. In various embodiments, the online system 102 includes a memory 144 comprising a non-transitory storage medium on which instructions are encoded. The memory 144 may have instructions encoded thereon corresponding to the modules further described below in conjunction with FIG. 3 that, when executed by the processor 142, cause the processor 142 to perform the functionality further described below in conjunction with FIGS. 2 and 4-5C. For example, the memory 144 has instructions encoded thereon that, when executed by the processor 142, cause the processor 142 to use a genetic algorithm to identify a balanced assignment of online system users to control and test groups for performing a test. Additionally, the online system 102 includes a communication interface configured to connect the online system 102 to one or more networks, such as network 120, or to otherwise communicate with devices (e.g., client devices 110) connected to the network(s).

One or more of a client device 110, a third-party system 130, or the online system 102 may be special-purpose computing devices configured to perform specific functions, as further described below in conjunction with FIGS. 2-5C, and may include specific computing components such as processors, memories, communication interfaces, and/or the like.

System Overview

Figure 2:
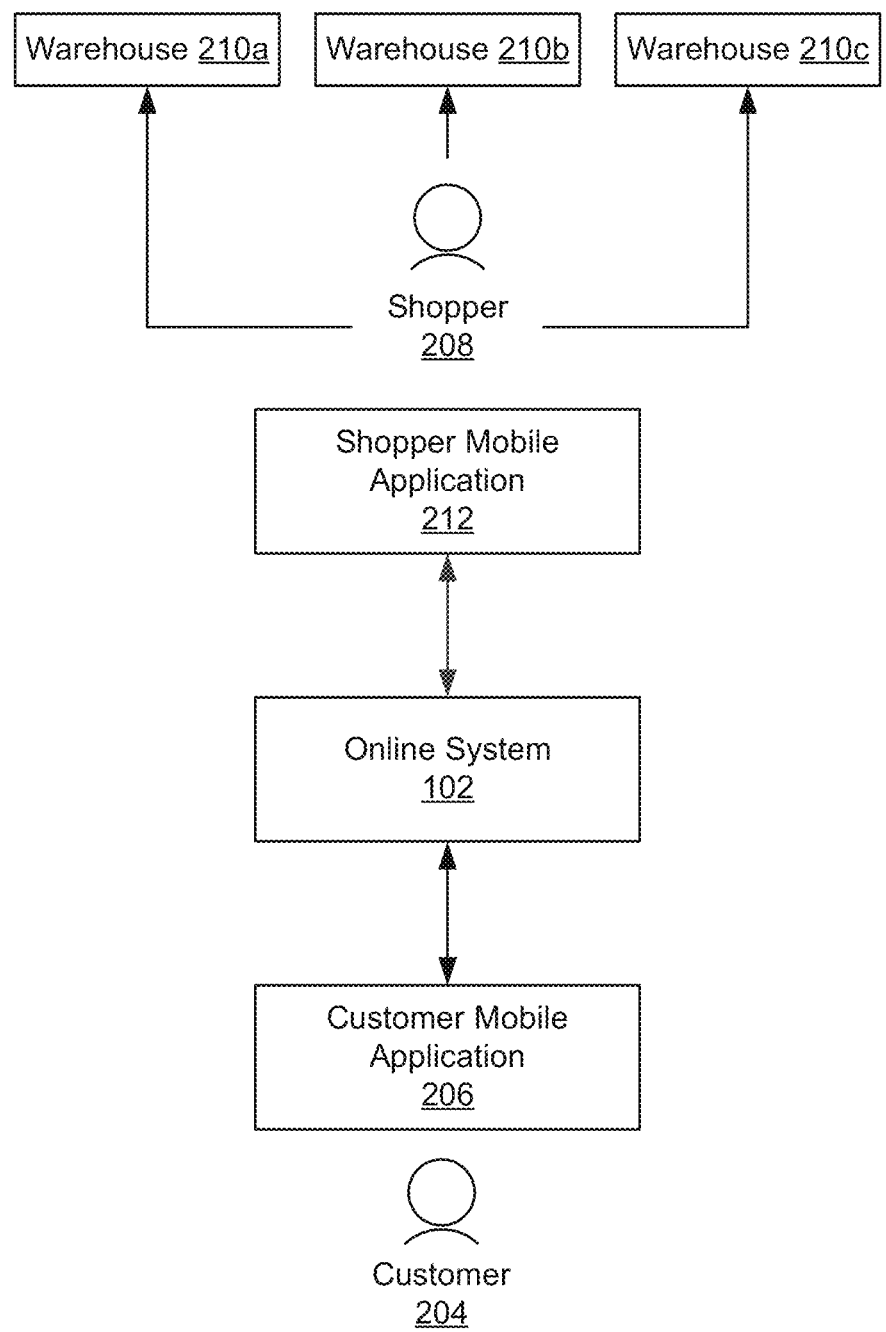
FIG. 2 illustrates an environment of an online system, according to one or more embodiments.

FIG. 2 illustrates an environment 200 of an online platform, such as an online system 102, according to one or more embodiments. The figures use like reference numerals to identify like elements. A letter after a reference numeral, such as "210a," indicates that the text refers specifically to the element having that particular reference numeral. A reference numeral in the text that is not followed by a letter, such as "210," refers to any or all of the elements in the figures bearing that reference numeral. For example, "210" in the text may refer to reference numerals "210a," "210b," and/or "210c" in the figures.

The environment 200 includes an online system (e.g., an online concierge system) 102. The online system 102 may be configured to receive orders from one or more customers 204 (only one is shown for the sake of simplicity). An order specifies a list of goods (items or products) to be delivered to a customer 204. An order also specifies a location to which goods are to be delivered, and a time window during which the goods should be delivered. In some embodiments, an order specifies one or more retailers from which goods should be purchased. A customer 204 may use a customer mobile application (CMA) 206, which is configured to communicate with the online system 102, to place an order.

The online system 102 also may be configured to transmit orders received from customers 204 to one or more shoppers 208. A shopper 208 may be a person (e.g., a contractor, an employee, etc.), an entity, or an autonomous device (e.g., a robot) enabled to fulfill orders received by the online system 102. A shopper 208 travels between a warehouse 210 and a delivery location (e.g., a customer's home or office) and may do so by car, truck, bicycle, scooter, foot, or via any other mode of transportation. In some embodiments, a delivery may be partially or fully automated, e.g., using a self-driving car. The environment 200 also includes three warehouses 210a, 210b, and 210c (while only three are shown for the sake of simplicity, the environment 200 may include hundreds of warehouses 210). The warehouses 210 may be physical retailers, such as grocery stores, discount stores, department stores, etc., or non-public warehouses 210 storing items that may be collected and delivered to customers 204. Each shopper 208 fulfills an order received from the online system 102 at one or more warehouses 210, delivers the order to a customer 204, or performs both fulfillment and delivery. In one or more embodiments, shoppers 208 make use of a shopper mobile application 212 which is configured to interact with the online system 102.

Figure 3:
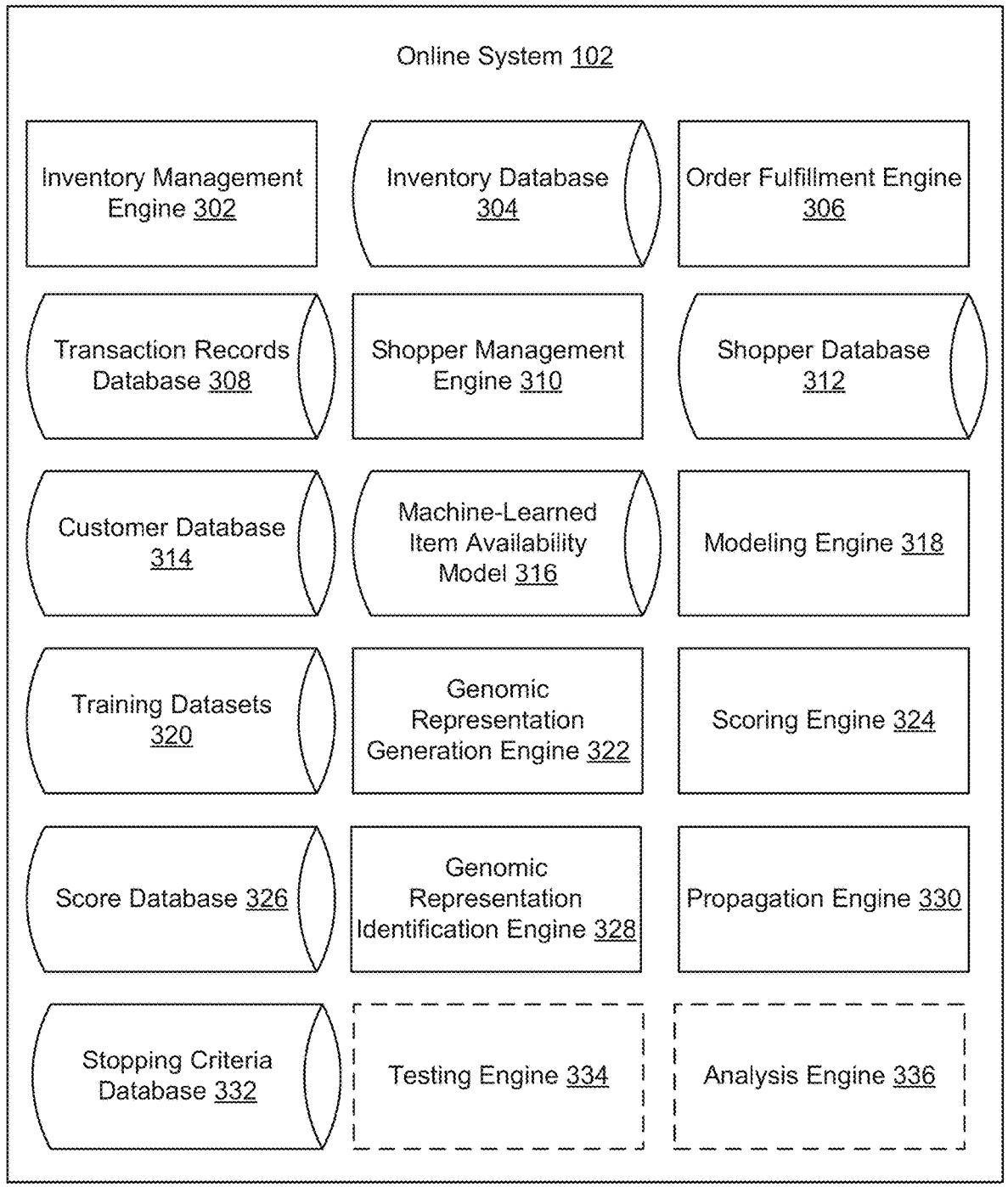
FIG. 3 is a diagram of an online system, according to one or more embodiments.

FIG. 3 is a diagram of an online system 102, according to one or more embodiments. In various embodiments, the online system 102 may include different or additional modules than those described in conjunction with FIG. 3. Furthermore, in some embodiments, the online system 102 includes fewer modules than those described in conjunction with FIG. 3.

The online system 102 includes an inventory management engine 302, which interacts with inventory systems associated with each warehouse 210. In one or more embodiments, the inventory management engine 302 requests and receives inventory information maintained by a warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and quantitative information about the items, including size, color, weight, SKU, serial number, etc. In one or more embodiments, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse 210), the inventory database 304 may store a time that the item was last found, a time that the item was last not found (e.g., if a shopper 208 looked for the item but could not find it), a rate at which the item is found, and a popularity of the item.

For each item, the inventory database 304 identifies one or more attributes of the item and corresponding values for each attribute of the item. For example, the inventory database 304 includes an entry for each item offered by a warehouse 210, in which an entry for an item includes an item identifier that uniquely identifies the item. The entry includes different fields, with each field corresponding to an attribute of the item. A field of an entry includes a value for an attribute corresponding to the field, allowing the inventory database 304 to maintain values of different attributes for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210, in which different levels of the taxonomy provide different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.) with the category. Thus, the taxonomy maintains associations between a category and specific items offered by the warehouse 210 matching the category. In some embodiments, different levels of the taxonomy identify items with differing levels of specificity based on any suitable attribute or combination of attributes of the items. For example, different levels of the taxonomy specify different combinations of attributes of items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels of the taxonomy include fewer details about items, so greater numbers of items are included in higher levels (e.g., higher levels include a greater number of items satisfying a broader category). Similarly, lower levels of the taxonomy include greater details about items, so fewer numbers of items are included in the lower levels (e.g., lower levels include a fewer number of items satisfying a more specific category). The taxonomy may be received from a warehouse 210 in various embodiments. In other embodiments, the inventory management engine 302 applies a trained classification model to an item catalog received from a warehouse 210 to include different items in levels of the taxonomy, so application of the trained classification model associates specific items with categories corresponding to levels within the taxonomy.

Inventory information provided by the inventory management engine 302 may supplement training datasets 320. Inventory information provided by the inventory management engine 302 may not necessarily include information about the outcome of fulfilling a delivery order associated with the item, whereas the data within the training datasets 320 is structured to include an outcome of fulfilling a delivery order (e.g., if an item in an order was or was not collected).

The online system 102 also includes an order fulfillment engine 306 which is configured to synthesize and display an ordering interface to each customer 204 (for example, via the customer mobile application 206). The order fulfillment engine 306 is also configured to access the inventory database 304 in order to determine which items are available at which warehouse 210. The order fulfillment engine 306 may supplement the item availability information from the inventory database 304 with item availability information predicted by a machine-learned item availability model 316. The order fulfillment engine 306 determines a sale price for each item ordered by a customer 204. Prices set by the order fulfillment engine 306 may or may not be identical to in-store prices determined by retailers (which is the price that customers 204 and shoppers 208 would pay at the retail warehouses 210). The order fulfillment engine 306 also facilitates transactions associated with each order. In one or more embodiments, the order fulfillment engine 306 charges a payment instrument associated with a customer 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device 110 of a customer 204 for display via the customer mobile application 206. The order fulfillment engine 306 receives a query comprising one or more terms from a customer 204 and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. Details of an order may indicate the items purchased, a total value of the items, and in some cases, an identity of a shopper 208 and a customer 204 associated with the order. In one or more embodiments, the order fulfillment engine 306 pushes transaction and/or order details asynchronously to retailer systems. This may be accomplished via the use of webhooks, which enable programmatic or system-driven transmission of information between web applications. In another embodiment, retailer systems may be configured to periodically poll the order fulfillment engine 306, which provides details of all orders which have been processed since the last request.

The order fulfillment engine 306 may interact with a shopper management engine 310, which manages communication with and utilization of shoppers 208. In one or more embodiments, the shopper management engine 310 receives a new order from the order fulfillment engine 306. The shopper management engine 310 identifies the appropriate warehouse 210 to fulfill the order based on one or more parameters, such as a probability of item availability determined by the machine-learned item availability model 316, the contents of the order, the inventory of the warehouses 210, and the proximity of the warehouses 210 to the delivery location. The shopper management engine 310 then identifies one or more appropriate shoppers 208 to fulfill the order based on one or more parameters, such as the shoppers' proximity to the appropriate warehouse 210 (and/or to the customer 204), his/her familiarity level with that particular warehouse 210, etc. Additionally, the shopper management engine 310 accesses a shopper database 312 which stores information describing each shopper 208, such as his/her name, gender, rating, previous shopping history, etc.

As part of fulfilling an order, the order fulfillment engine 306 and/or shopper management engine 310 may access a customer database 314, which stores information describing each customer 204. This information may include each customer's name, address, gender, shopping preferences, favorite items, stored payment instruments, etc.

In various embodiments, the order fulfillment engine 306 determines whether to delay display of a received order to shoppers 208 for fulfillment by a time interval. In response to determining to delay display of the received order by a time interval, the order fulfilment engine 306 evaluates subsequent orders received during the time interval for inclusion in one or more batches that also include the received order. After the time interval, the order fulfillment engine 306 displays the order to one or more shoppers 208 via the shopper mobile application 212; if the order fulfillment engine 306 generated one or more batches including the received order and one or more subsequent orders received during the time interval, the batch(es) is/are also displayed to one or more shoppers 208 via the shopper mobile application 212.

Machine Learning Models

The online system 102 further includes the machine-learned item availability model 316, a modeling engine 318, and the training datasets 320. The modeling engine 318 uses the training datasets 320 to generate the machine-learned item availability model 316. The machine-learned item availability model 316 may learn from the training datasets 320, rather than follow only explicitly programmed instructions. The inventory management engine 302, order fulfillment engine 306, and/or shopper management engine 310 may use the machine-learned item availability model 316 to determine a probability that an item is available at a warehouse 210. The machine-learned item availability model 316 may be used to predict item availability for items being displayed to or selected by a customer 204 or included in received delivery orders. A single machine-learned item availability model 316 is used to predict the availability of any number of items.

The machine-learned item availability model 316 may be configured to receive, as inputs, information about an item, a warehouse 210 for collecting the item, and a time for collecting the item. The machine-learned item availability model 316 may be adapted to receive any information that the modeling engine 318 identifies as an indicator of item availability. At a minimum, the machine-learned item availability model 316 receives information about an item-warehouse pair, such as an item in a delivery order and a warehouse 210 at which the order may be fulfilled. Items stored in the inventory database 304 may be identified by item identifiers. As described above, various characteristics, some of which are specific to a warehouse 210 (e.g., a time that an item was last found in the warehouse 210, a time that the item was last not found in the warehouse 210, a rate at which the item is found, a popularity of the item, etc.) may be stored for each item in the inventory database 304. Similarly, each warehouse 210 may be identified by a warehouse identifier and stored in a warehouse database along with information about the warehouse 210. A particular item at a particular warehouse 210 may be identified using an item identifier and a warehouse identifier. In other embodiments, the item identifier refers to a particular item at a particular warehouse 210, so that the same item at two different warehouses 210 is associated with two different identifiers. For convenience, both of these options to identify an item at a warehouse 210 are referred to herein as an "item-warehouse pair." Based on the identifier(s), the online system 102 may extract information about the item and/or warehouse 210 from the inventory database 304 and/or warehouse database and provide this extracted information as inputs to the machine-learned item availability model 316.

The machine-learned item availability model 316 contains a set of functions generated by the modeling engine 318 from the training datasets 320 that relate an item, a warehouse 210, timing information, and/or any other relevant inputs, to a probability that the item is available at the warehouse 210. Thus, for a given item-warehouse pair, the machine-learned item availability model 316 outputs a probability that the item is available at the warehouse 210. The machine-learned item availability model 316 constructs a relationship between the item-warehouse pair, the timing information, and/or any other inputs and the probability of availability (also referred to as "availability") that is generic enough to apply to any number of different item-warehouse pairs. In some embodiments, the probability output by the machine-learned item availability model 316 includes a confidence score. The confidence score may be the error or uncertainty score of the probability of availability and may be calculated using any standard statistical error measurement. In some embodiments, the confidence score is based in part on whether the item-warehouse pair availability prediction was accurate for previous delivery orders (e.g., if an item was predicted to be available at a warehouse 210 and was not found by a shopper 208 or was predicted to be unavailable but was found by the shopper 208). In various embodiments, the confidence score is based in part on the age of the data for the item (e.g., if availability information has been received within the past hour or the past day). The set of functions of the machine-learned item availability model 316 may be updated and adapted following retraining with new training datasets 320. The machine-learned item availability model 316 may be any machine learning model, such as a neural network, a boosted tree, a gradient-boosted tree, or a random forest model. In some embodiments, the machine-learned item availability model 316 is generated from the XGBoost algorithm. The probability of availability of an item generated by the machine-learned item availability model 316 may be used to determine instructions delivered to a customer 204 and/or shopper 208, as described in further detail below.

The training datasets 320 relate a variety of different factors to known item availabilities from the outcomes of previous delivery orders (e.g., if an item was previously found or previously unavailable). The training datasets 320 include items included in previous delivery orders, whether the items in the previous delivery orders were collected, warehouses 210 associated with the previous delivery orders, and a variety of characteristics associated with each of the items, which may be obtained from the inventory database 304. Each piece of data in the training datasets 320 includes an outcome of a previous delivery order (e.g., whether an item was collected). Item characteristics may be determined by the machine-learned item availability model 316 to be statistically significant factors predictive of an item's availability. Item characteristics that are predictors of availability may be different for different items. For example, an item type factor might be the best predictor of availability for dairy items, whereas a time of day may be the best predictive factor of availability for vegetables. For each item, the machine-learned item availability model 316 may weight these factors differently, in which the weights are a result of a "learning" or a training process on the training datasets 320. The training datasets 320 are very large datasets taken across a wide cross section of warehouses 210, shoppers 208, items, delivery orders, times, and item characteristics. The training datasets 320 are large enough to provide a mapping from an item in an order to a probability that the item is available at a warehouse 210. In addition to previous delivery orders, the training datasets 320 may be supplemented by inventory information provided by the inventory management engine 302. In some embodiments, the training datasets 320 are historical delivery order information used to train the machine-learned item availability model 316, whereas the inventory information stored in the inventory database 304 includes factors input into the machine-learned item availability model 316 to determine an item availability for an item in a newly received delivery order. In various embodiments, the modeling engine 318 may evaluate the training datasets 320 to compare a single item's availability across multiple warehouses 210 to determine if an item is chronically unavailable, which may indicate that the item is no longer manufactured. The modeling engine 318 may query a warehouse 210 through the inventory management engine 302 for updated item information about any such items.

Machine Learning Factors

The training datasets 320 include times associated with previous delivery orders. In some embodiments, the training datasets 320 include a time of day at which each previous delivery order was placed. Item availability may be impacted by time of day since items that are otherwise regularly stocked by warehouses 210 may become unavailable during high-volume shopping times. In addition, item availability may be affected by restocking schedules. For example, if a warehouse 210 mainly restocks items at night, item availability at the warehouse 210 will tend to decrease over the course of the day. Additionally, or alternatively, the training datasets 320 include a day of the week that previous delivery orders were placed. The day of the week may impact item availability since warehouses 210 may have reduced item inventory on popular shopping days and restocking shipments may be received on particular days. In some embodiments, the training datasets 320 include a time interval since an item was previously collected for a previous delivery order. If an item has recently been collected at a warehouse 210, this may increase the probability that it is still available. If a long interval of time has elapsed since an item has been collected, this may indicate that the probability that the item is available for subsequent orders is low or uncertain. In some embodiments, the training datasets 320 include a time interval since an item in a previous delivery order was not found. If a short interval of time has elapsed since an item was not found, this may indicate that there is a low probability that the item will be available for subsequent delivery orders. Conversely, if a long interval of time has elapsed since an item was not found, this may indicate that the item may have been restocked and will be available for subsequent delivery orders. In some embodiments, the training datasets 320 may also include a rate at which an item is typically found by a shopper 208 at a warehouse 210, a number of days since inventory information about the item was last received from the inventory management engine 302, a number of times the item was not found during a previous week, or any number of additional rate-related or time-related information. Relationships between this rate-related and/or time-related information and item availability are determined by the modeling engine 318, which trains a machine learning model with the training datasets 320, producing the machine-learned item availability model 316.

The training datasets 320 include item characteristics. In some embodiments, the item characteristics include a department associated with an item. For example, if an item is yogurt, it is associated with a dairy department. Examples of departments include bakery, beverage, nonfood, pharmacy, produce, floral, deli, prepared foods, meat, seafood, dairy, or any other categorization of items used by a warehouse 210. A department associated with an item may affect item availability since different departments have different item turnover rates and inventory levels. In some embodiments, the item characteristics include an aisle of a warehouse 210 associated with an item. The aisle of the warehouse 210 may affect item availability since different aisles of a warehouse 210 may be re-stocked more frequently than others. Additionally, or alternatively, the item characteristics may include an item popularity score. The item popularity score for an item may be proportional to the number of delivery orders received that include the item. An alternative or additional item popularity score may be provided by a retailer through the inventory management engine 302. In some embodiments, the item characteristics include a product type associated with an item. For example, if an item is a particular brand of a product, the product type will be a generic description of the product type, such as "milk" or "eggs." The product type may affect item availability since certain product types may have higher turnover and re-stocking rates than others or may have larger inventories in the warehouses 210. In some embodiments, the item characteristics may include a number of times a shopper 208 was instructed to keep looking for an item after he or she was initially unable to find the item, a total number of delivery orders received for an item, whether or not an item is organic, vegan, gluten free, or any other characteristics associated with an item. The relationships between item characteristics and item availability are determined by the modeling engine 318, which trains a machine learning model with the training datasets 320, producing the machine-learned item availability model 316.

The training datasets 320 may include additional item characteristics that affect item availability and may therefore be used to build the machine-learned item availability model 316 relating a delivery order including an item to the item's predicted availability. The training datasets 320 may be periodically updated with recent delivery orders. The training datasets 320 may be updated with item availability information provided directly from shoppers 208. Following updating of the training datasets 320, the modeling engine 318 may retrain a model with the updated training datasets 320 and produce a new machine-learned item availability model 316.

Balanced Assignment Components

The online system 102 further includes a genomic representation generation engine 322. The genomic representation generation engine 322 generates an initial population of genomic representations, in which each genomic representation includes multiple genes. Each gene of a genomic representation represents a unit of one or more users of the online system 102 (e.g., one or more customers 204 and/or one or more shoppers 208) assigned to a test group or a control group for performing a test (e.g., an A/B test), such that the genomic representation represents a potential set of assignments of the users to the groups. In various embodiments, the genomic representation generation engine 322 may generate an initial population of genomic representations for a test to be performed at a user level. In such embodiments, each gene or unit may correspond to a single user of the online system 102. In some embodiments, the genomic representation generation engine 322 may generate an initial population of genomic representations for a test to be performed at a market level. In such embodiments, each gene or unit may correspond to one or more online system users associated with a geographic location. For example, a gene or unit may correspond to online system users associated with a neighborhood, a zip code, a city, a county, a state, a region, a country, a continent, etc.

The genomic representation generation engine 322 may generate an initial population of genomic representations for a test to measure the effects of one or more versions of a treatment. Each unit may be assigned to only one group regardless of the number of versions of a treatment being tested. For example, if the genomic representation generation engine 322 generates an initial population of genomic representations for an A/B test to measure the effect of a single version of a treatment, each unit may be assigned to either a test group or a control group, but not both. Similarly, if the genomic representation generation engine 322 generates an initial population of genomic representations for an A/B test to measure the effects of multiple versions of a treatment, each unit may be assigned to one of multiple test groups or a control group, but not both.

The genomic representation generation engine 322 may generate an initial population of genomic representations using various techniques. In some embodiments, the initial population of genomic representations may be generated using a random sampling technique. For example, the genomic representation generation engine 322 may generate an initial population of genomic representations using simple random sampling, stratified random sampling, etc. In various embodiments, the initial population of genomic representations may be generated using a heuristic technique. For example, depending on a treatment being tested, genomic representations may be seeded within an initial population of genomic representations based on their likelihood of being optimal assignments of the units.

The number of genomic representations included among an initial population of genomic representations generated by the genomic representation generation engine 322 may be based on various factors. In various embodiments, the size of the initial population of genomic representations may be determined based on the number of units that may be assigned to the control or test groups and/or the number of versions of a treatment being tested. For example, the number of genomic representations included in an initial population of genomic representations may be proportional to the number of units that may be assigned to the control or test groups and/or the number of versions of a treatment being tested. In some embodiments, the number of genomic representations included among an initial population of genomic representations may be determined based on a set of stopping criteria for repeating a propagation process, as further described below. For example, if a set of stopping criteria includes a predetermined time interval, the number of genomic representations included among an initial population of genomic representations may be proportional to the time interval.

The online system 102 further includes a scoring engine 324, which computes scores for genomic representations. The scoring engine 324 may compute a score for a genomic representation based on a difference between a first value and a second value, in which the first value is based on one or more metrics associated with a set of online system users assigned to a test group and the second value is based on the metric(s) associated with a second set of online system users assigned to a control group for the genomic representation.

For example, if a metric corresponds to an acceptance rate of batches of orders for fulfillment by shoppers 208, the scoring engine 324 may compute the score for a genomic representation by determining a first value and a second value. In this example, the first value is an average of the acceptance rate by shoppers 208 assigned to a control group for the corresponding genomic representation and the second value is an average of the acceptance rate by shoppers 208 assigned to a test group for the corresponding genomic representation. Continuing with this example, the scoring engine 324 may compute the score for the genomic representation as a difference between the first value and the second value. In some embodiments, the difference between the first value and the second value used to compute the score for a genomic representation may correspond to a cosine similarity, a Mahalanobis distance, a root-mean-square distance, or any other suitable measure of difference/distance. In embodiments in which the score is computed based on a difference between values that are based on multiple metrics, the differences may be determined for multiple dimensions corresponding to the metrics. Furthermore, in embodiments in which multiple versions of a treatment are being tested, such that online system users are assigned to multiple test groups, the scoring process may be performed in an analogous manner for each test group.

Once the scoring engine 324 has computed the score for a genomic representation, it may store the score in the score database 326. A score for a genomic representation may be stored in association with various types of information (e.g., information describing and/or identifying the genomic representation, information indicating when the genomic representation was generated, information identifying one or more genomic representations from which it was generated, one or more genetic operators by which it was generated, etc.). For example, a score for a genomic representation may be stored in association with a time at which it was generated, information describing the genes included in the genomic representation, and information identifying a population to which the genomic representation belongs (e.g., an initial population, a second-generation population, a third-generation population, etc., as further described below). As an additional example, if a genomic representation is included among a population of genomic representations other than an initial population, a score for the genomic representation may be stored in association with information identifying one or more genomic representations from which it was generated. In this example, the score also may be stored in association with information indicating whether the genomic representation was generated by mutation, recombination, elitism, etc., as further described below.

The online system 102 further includes a genomic representation identification engine 328. The genomic representation identification engine 328 identifies one or more genomic representations from a population of genomic representations (e.g., an initial population, a second-generation population, a third-generation population, etc.) having at least a threshold score. In some embodiments, the genomic representation identification engine 328 may do so by ranking the population of genomic representations based on their scores and identifying a number or percentage of highest ranked genomic representations. For example, the genomic representation identification engine 328 may rank a population of genomic representations from highest to lowest based on their scores, in which the genomic representations with higher scores are ranked higher than genomic representations with lower scores. In this example, if there are 100 genomic representations in the population, the genomic representation identification engine 328 may identify the top 10 genomic representations in the ranking or the genomic representations included in the top 10% of the ranking.

The genomic representation identification engine 328 also may identify one or more genomic representations from a population of genomic representations by comparing the scores associated with the genomic representations in the population to a threshold score. For example, the genomic representation identification engine 328 may identify a genomic representation if it is associated with a score that is equal to or greater than a threshold score and may not identify a genomic representation if it is associated with a score that is less than the threshold score. In various embodiments, the threshold score may correspond to a score associated with a genomic representation included in a previous generation of genomic representations. For example, suppose that the genomic representation identification engine 328 is identifying one or more genomic representations from a second-generation population of genomic representations. In this example, the genomic representation identification engine 328 may identify a genomic representation included in the second-generation population if it has a score that is greater than or equal to a score associated with a genomic representation included in an initial population of genomic representations from which it was generated.

In various embodiments, the genomic representation identification engine 328 also may identify one or more genomic representations included in a population of genomic representations using other techniques. In some embodiments, the genomic representation identification engine 328 may identify the genomic representation(s) based on the relative scores associated with the genomic representations included in the population of genomic representations. For example, the genomic representation identification engine 328 may identify one or more genomic representations using a roulette wheel selection method, a stochastic universal sampling method, a tournament selection method, a rank selection method, or any other suitable technique, such that genomic representations associated with higher scores are more likely to be identified than genomic representations associated with lower scores.

The genomic representation identification engine 328 also selects a genomic representation from one or more populations of genomic representations (e.g., an initial population, a second-generation population, a third-generation population, etc.) based on one or more scores associated with one or more genomic representations. In some embodiments, the genomic representation identification engine 328 selects a genomic representation associated with a highest score. For example, the genomic representation identification engine 328 may select a genomic representation associated with a highest score from an initial population of genomic representations and every population of genomic representations (e.g., a second-generation population, a third-generation population, etc.) subsequently generated from the initial population. Alternatively, in the above example, if the propagation engine 330 uses a genetic operator (e.g., elitism) to propagate all genes from genomic representations associated with at least a threshold score to a subsequent generation of genomic representations, as further described below, the online system 102 may select the genomic representation associated with the highest score from a population of genomic representations that was generated last. The genomic representation identification engine 328 may select a genomic representation using various techniques. For example, the genomic representation identification engine 328 may rank the scores associated with genomic representations included among one or more populations of genomic representations and select the genomic representation associated with the highest score based on the ranking. As an additional example, the genomic representation identification engine 328 may compare different pairs of genomic representations included among one or more populations of genomic representations based on their scores, select the genomic representation of each pair having the higher score, and continue to compare pairs of selected genomic representations until the genomic representation associated with the highest score is selected.

The online system 102 further includes a propagation engine 330. The propagation engine 330 executes a propagation process for one or more populations of genomic representations based on a genetic algorithm. The propagation engine 330 does so by accessing the genomic representation identification engine 328 to identify one or more genomic representations from a population of genomic representations having at least a threshold score and the scoring engine 324 to compute scores for genomic representations, as described above.

During the propagation process, the propagation engine 330 also propagates one or more genes included in one or more "parent" genomic representations identified by the genomic representation identification engine 328 to one or more additional "child" genomic representations. The child genomic representation(s) is/are included among a subsequent generation of genomic representations, such that the child genomic representation(s) "inherit" the gene(s) from the parent genomic representation(s). One or more genes included in a parent genomic representation may be propagated any number of times to any number of child genomic representations. The propagation engine 330 may propagate the gene(s) via one or more genetic operators used by a genetic algorithm (e.g., mutation, recombination, elitism, etc.). In embodiments in which the propagation engine 330 propagates the gene(s) via mutation, the mutation may occur via any mutation method (e.g., bit flip, swap, inversion, scramble, etc.). For example, suppose that the genomic representation identification engine 328 identifies a genomic representation included in an initial population of genomic representations. In this example, the propagation engine 330 may propagate one or more genes included in this parent genomic representation to a child genomic representation included in a second-generation population of genomic representations via mutation, such that the child genomic representation is generated from genes of the parent genomic representation by inheriting one or more genes from the parent genomic representation. Continuing with this example, if the mutation involves a bit flip, a unit within the parent genomic representation that was assigned to a treatment group is now assigned to a control group in the child genomic representation and another unit within the parent genomic representation that was assigned to the control group is now assigned to the treatment group in the child genomic representation, while all other genes of the parent genomic representation are inherited by the child genomic representation. Alternatively, in the above example, the propagation engine 330 may propagate genes included in the parent genomic representation to the child genomic representation included in the second-generation population of genomic representations via elitism, such that the child genomic representation inherits all the genes from the parent genomic representation.

As described above, in some embodiments, the propagation engine 330 may propagate one or more genes included in one or more parent genomic representations identified by the genomic representation identification engine 328 to one or more additional child genomic representations via recombination. In such embodiments, the recombination may occur via a one-point crossover, a two-point crossover, uniform crossover, etc. For example, suppose that the genomic representation identification engine 328 identifies a pair of genomic representations included in an initial population of genomic representations. In this example, the propagation engine 330 may propagate one or more genes included in this pair of parent genomic representations to one or more child genomic representations included in a second-generation population of genomic representations via recombination, such that the child genomic representations are generated from genes of both parent genomic representations by inheriting one or more genes from both parent genomic representations. Continuing with this example, if the recombination involves a two-point crossover, the genes between the crossover points of the genomic representation corresponding to one parent and the genes from the crossover points to the ends of the genomic representation corresponding to the other parent are inherited by one child genomic representation. In the above example, the remainder of the genes of both parent genomic representations are inherited by another child genomic representation. Although only two parent genomic representations and two child genomic representations are described in the example above, in some embodiments, a recombination may involve more genomic representations and/or child genomic representations. Furthermore, although only two crossover points are described in the example above, a recombination may involve any number of crossover points.

The propagation engine 330 may repeat the propagation process for each population of genomic representations generated during the propagation process until a set of stopping criteria (e.g., stored in the stopping criteria database 332, as further described below) has been met. The propagation engine 330 may determine whether a set of stopping criteria has been met by accessing the set of stopping criteria (e.g. from the stopping criteria database 332) and comparing the set of stopping criteria to a current set of conditions. For example, the stopping criteria may include 50 generations or populations of genomic representations, such that when 50 generations or populations of genomic representations have been generated, this criterium has been met. In the above example, if the stopping criteria also includes a predetermined time interval of two hours, this criterium is met two hours from a starting time (e.g., when an initial population of genomic representations is generated). In embodiments in which a set of stopping criteria is stored in association with a set of rules, the propagation engine 330 also may determine whether the set of stopping criteria has been met based on the set of rules. In the above example, if the set of stopping criteria is stored in association with a set of rules indicating that the set of stopping criteria is met when any of the criteria are met, the propagation engine 330 may determine that the set of stopping criteria is met when 50 generations or populations of genomic representations have been generated or two hours from the starting time, whichever occurs first.

In some embodiments, the online system 102 further includes the stopping criteria database 332. The stopping criteria database 332 may store a set of stopping criteria for repeating the propagation process performed by the propagation engine 330. In some embodiments, a set of stopping criteria for repeating the propagation process may be a set of default stopping criteria, while in other embodiments, the set of stopping criteria may be specified for repeating the propagation process prior to or during execution of the propagation process. In various embodiments, the stopping criteria may include a predetermined number of genomic representations or populations of genomic representations, a predetermined time interval, a quality metric, and/or any other suitable criteria. In various embodiments, a set of stopping criteria may be stored in the stopping criteria database 332 in association with various types of information (e.g., information identifying one or more populations of genomic representations associated with the set of stopping criteria, a set of rules describing when the set of criteria is met, etc.). For example, stopping criteria may be stored in association with a set of rules indicating that the stopping criteria are met when any of the criteria are met. In embodiments in which a set of stopping criteria includes a quality metric, the quality metric may be based on a score associated with a genomic representation. For example, the quality metric may correspond to a highest score associated with a genomic representation out of 1,000,000 genomic representations.

In some embodiments, the online system 102 further includes a testing engine 334. The testing engine 334 may assign users of the online system 102 to a control group and one or more test groups for performing a test (e.g., an A/B test) based on a genomic representation selected by the genomic representation identification engine 328. For example, if each gene included in a genomic representation selected by the genomic representation identification engine 328 corresponds to users of the online system 102 in a market (e.g., a zip code, a city, a region, a state, a country, etc.) assigned to a test group or a control group, the testing engine 334 may assign the users in each market to a group indicated by the genomic. Alternatively, in the above example, if each gene included in the genomic representation corresponds to a user of the online system 102 assigned to the test group or the control group, the testing engine 334 may assign each user to a group indicated by the genomic representation.

The testing engine 334 also may perform a test based on an assignment of users of the online system 102 to a control group and one or more test groups. To perform a test, the testing engine 334 applies a treatment to a test group, but not a control group. For example, if a treatment corresponds to different costs charged to customers 204, a new cost is applied to customers 204 assigned to a treatment group but not to customers 204 assigned to the control group, such that customers 204 in the treatment group are charged the new cost and customers 204 in the control group are charged the original cost. In this example, effects of the treatment and the absence of the treatment may be measured as the average rates orders are placed by customers 204 in the test group and the control group, respectively. Alternatively, in the above example, if multiple versions of the treatment are being tested, different versions of the treatment are applied to different test groups and the effects of each version of the treatment is measured as the average rate orders are placed by customers 204 in the corresponding test group.

In some embodiments, the online system 102 further includes an analysis engine 336. In various embodiments, the analysis engine 336 may identify one or more metrics associated with a set of users of the online system 102. In some embodiments, the analysis engine 336 may identify a metric associated with a set of users based on a treatment associated with a test group (e.g., based on correlations between the metric and the treatment, factors that affect the metric and the treatment, etc.). For example, if a treatment corresponds to an increased pay rate or other incentive for shoppers 208 to accept batches of orders for fulfillment, the analysis engine 336 may identify a metric corresponding to an average amount of time elapsed between the presentation of batches of orders to one or more shoppers 208 and acceptance of the batches of orders for fulfillment by the shopper(s) 208. In the above example, the analysis engine 336 may identify an additional metric corresponding to an average acceptance rate of batches of orders for fulfillment by the shopper(s) 208. In some embodiments, the analysis engine 336 also may identify one or more metrics associated with a set of users that include "guardrail metrics," which may indicate negative impacts of a treatment on key business metrics associated with the online system 102. For example, guardrail metrics may correspond to a rate that orders are delivered late, cost and supply states, etc. In various embodiments, one or more metrics associated with a set of users of the online system 102 also or alternatively may be identified in other ways (e.g., by a data scientist familiar with a treatment).

The analysis engine 336 also may analyze a result of performing a test (e.g., an A/B test) based on an assignment of online system users to a control group and one or more test groups. The analysis engine 336 may do so using one or more tests/techniques, such as a permutation test, a bootstrap test, a difference-in-differences technique, or any other suitable tests or techniques. For example, the analysis engine 336 may analyze a result of an A/B test to estimate the population distribution for the test using a permutation test and/or a bootstrap test. As an additional example, the analysis engine 336 may use a difference-in-differences technique to identify significant differences in an outcome of an A/B test for treatment and control groups in the test. Once the analysis engine 336 has analyzed the result of performing a test, various decisions may be made, such as whether the test results were reliable, whether to enact new policies based on the test results, whether to continue testing, whether to retest the treatment (e.g., at the user level or at a different market level), etc.

Figure 4:
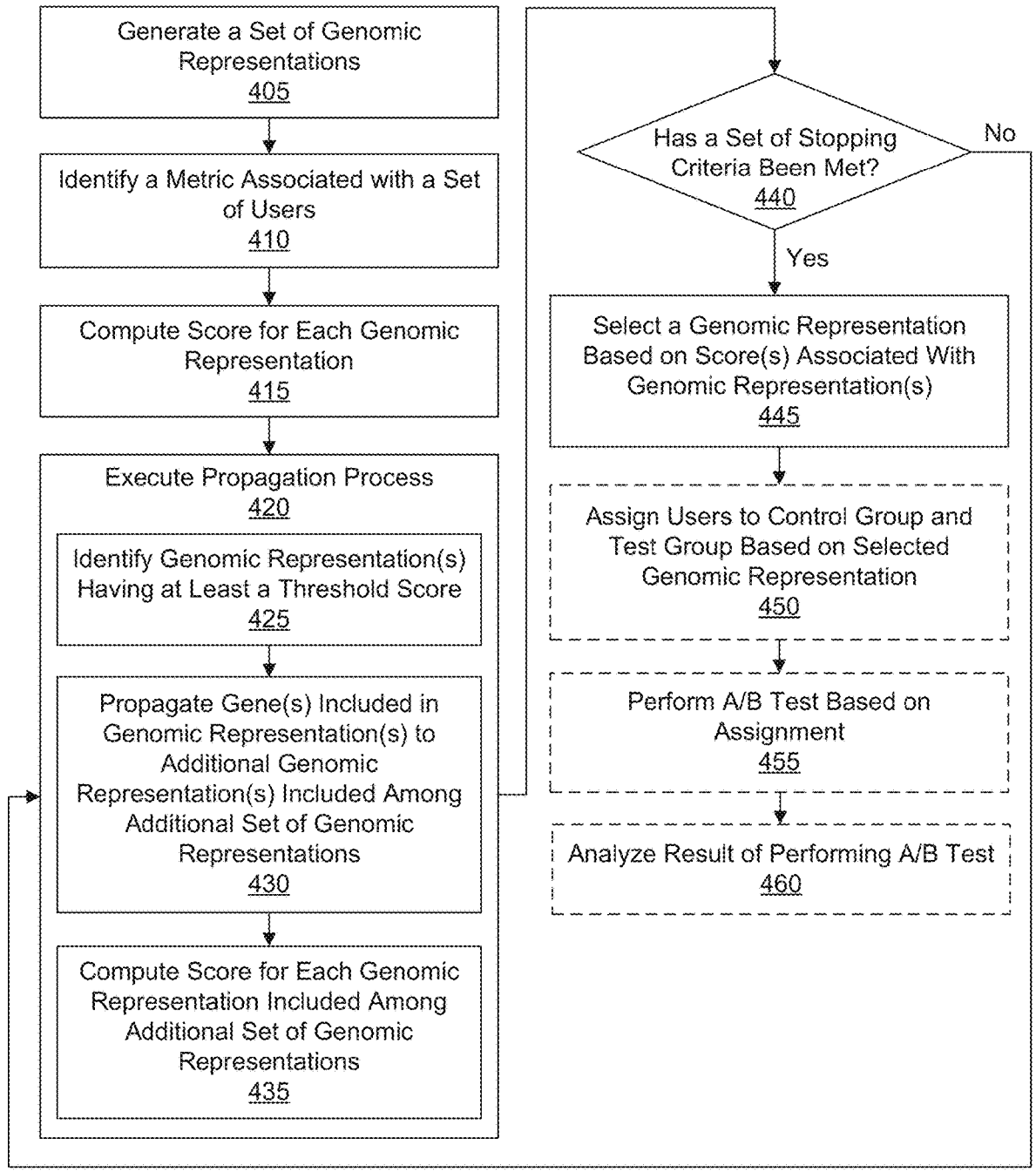
FIG. 4 is a flowchart of a method for using a genetic algorithm to identify a balanced assignment of online system users to control and test groups for performing a test, according to one or more embodiments.

Using a Genetic Algorithm to Identify a Balanced Assignment of Online System Users to Control and Test Groups for Performing a Test FIG. 4 is a flowchart of a method for using a genetic algorithm to identify a balanced assignment of online system users to control and test groups for performing a test, according to one or more embodiments. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online system 102 in various embodiments, while in other embodiments, the steps of the method are performed by any online system capable of retrieving items.

The online system 102 generates 405 (e.g., using the genomic representation generation engine 322) an initial population of genomic representations, in which each genomic representation includes multiple genes. Each gene of a genomic representation represents a unit of one or more users of the online system 102 (e.g., one or more customers 204 and/or one or more shoppers 208) assigned to a test group or a control group for performing a test (e.g., an A/B test), such that the genomic representation represents a potential set of assignments of the users to the groups. In various embodiments, the test for which the online system 102 generates 405 the initial population of genomic representations may be performed at a user level. In such embodiments, each gene or unit may correspond to a single user of the online system 102. In some embodiments, the test for which the online system 102 generates 405 the initial population of genomic representations may be performed at a market level. In such embodiments, each gene or unit may correspond to one or more online system users associated with a geographic location. For example, a gene or unit may correspond to online system users associated with a neighborhood, a zip code, a city, a county, a state, a region, a country, a continent, etc.

The online system 102 may generate 405 the initial population of genomic representations for the test to measure the effects of one or more versions of a treatment. Each unit may be assigned to only one group regardless of the number of versions of the treatment being tested. For example, if the online system 102 generates 405 the initial population of genomic representations for an A/B test to measure the effect of a single version of a treatment, each unit may be assigned to either the test group or the control group, but not both. Similarly, if the online system 102 generates 405 the initial population of genomic representations for an A/B test to measure the effects of multiple versions of a treatment, each unit may be assigned to one of multiple test groups or the control group, but not both.

Figure 5A:
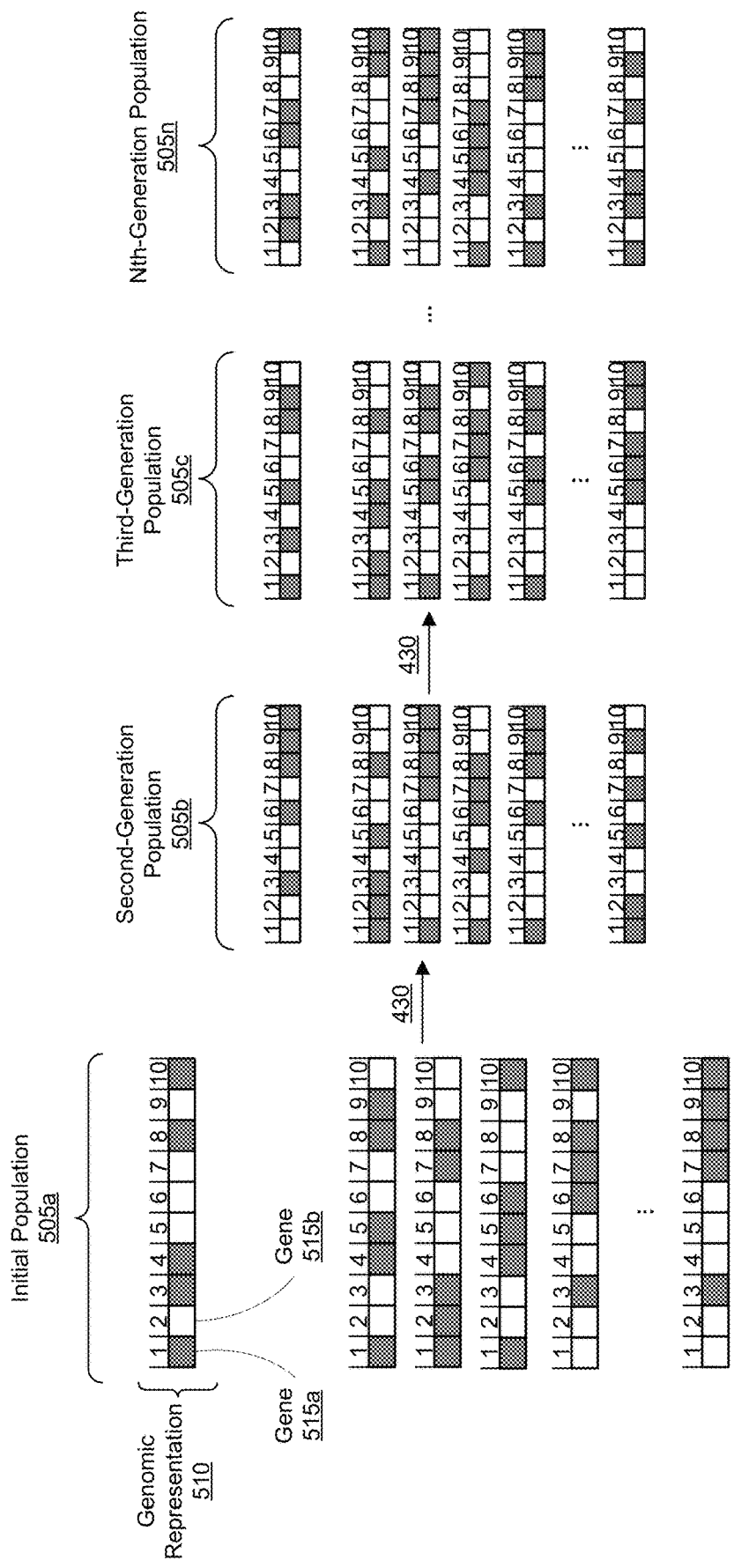
FIG. 5A illustrates examples of populations of genomic representations, according to one or more embodiments.

FIG. 5A illustrates examples of populations 505 of genomic representations 510, according to one or more embodiments. As shown in FIG. 5A, the initial population 505a of genomic representations 510 includes multiple genomic representations 510, as do a second-generation population 505b of genomic representations 510, a third-generation population 505c of genomic representations 510, etc., which are further described below. Although each genomic representation 510 shown in FIG. 5A includes only 10 genes 515, a genomic representation 510 may include any number of genes 515 that corresponds to the number of units of online system users that will be participating in the test. Furthermore, whether a gene 515 corresponds to a unit assigned to the test group or the control group is indicated by whether the unit is shaded, such that gene 515a and gene 515b are assigned to different groups, as indicated by differences in their shading. Additionally, although units of the genomic representations 510 shown in FIG. 5A are assigned to either the control group or a single test group, a genomic representation 510 may include units assigned to any number of test groups that each correspond to a different version of the treatment.

The online system 102 may generate 405 the initial population 505a of genomic representations 510 using various techniques. In some embodiments, the initial population 505a of genomic representations 510 may be generated 405 using a random sampling technique. For example, the online system 102 may generate 405 the initial population 505a of genomic representations 510 using simple random sampling, stratified random sampling, etc. In various embodiments, the initial population 505a of genomic representations 510 may be generated 405 using a heuristic technique. For example, depending on the treatment being tested, genomic representations 510 may be seeded within the initial population 505a of genomic representations 510 based on their likelihood of being optimal assignments of the units.

The number of genomic representations 510 included among the initial population 505a of genomic representations 510 generated 405 by the online system 102 may be based on various factors. In various embodiments, the size of the initial population 505a of genomic representations 510 may be determined based on the number of units that may be assigned to the control or test groups and/or the number of versions of the treatment being tested. For example, the number of genomic representations 510 included in the initial population 505a of genomic representations 510 may be proportional to the number of units that may be assigned to the control or test groups and/or the number of versions of the treatment being tested. In some embodiments, the number of genomic representations 510 included among the initial population 505a of genomic representations 510 may be determined based on a set of stopping criteria for repeating a propagation process, as further described below. For example, if the set of stopping criteria includes a predetermined time interval, the number of genomic representations 510 included among the initial population 505a of genomic representations 510 may be proportional to the time interval.

Referring back to FIG. 4, the online system 102 then identifies 410 (e.g., using the analysis engine 336) one or more metrics associated with a set of users of the online system 102. In some embodiments, the online system 102 may identify 410 a metric based on the treatment associated with the test group (e.g., based on correlations between the metric and the treatment, factors that affect the metric and the treatment, etc.). For example, if the treatment corresponds to an increased pay rate or other incentive for shoppers 208 to accept batches of orders for fulfillment, the online system 102 may identify 410 a metric corresponding to an average amount of time elapsed between the presentation of batches of orders to one or more shoppers 208 and acceptance of the batches of orders for fulfillment by the shopper(s) 208. In the above example, the online system 102 may identify 410 an additional metric corresponding to an average acceptance rate of batches of orders for fulfillment by the shopper(s) 208. In some embodiments, the metric(s) identified 410 by the online system 102 also may include "guardrail metrics," which may indicate negative impacts of the treatment on key business metrics associated with the online system 102. For example, guardrail metrics may correspond to a rate that orders are delivered late, cost and supply states, etc. In various embodiments, the metric(s) also or alternatively may be identified 410 in other ways (e.g., by a data scientist familiar with the treatment).

The online system 102 then computes 415 (e.g., using the scoring engine 324) a score for each genomic representation 510 included among the initial population 505a of genomic representations 510. The online system 102 may compute 415 the score for a genomic representation 510 based on a difference between a first value and a second value, in which the first value is based on the metric(s) associated with a set of online system users assigned to the test group and the second value is based on the metric(s) associated with a second set of online system users assigned to the control group for the genomic representation 510. For example, if a metric corresponds to an acceptance rate of batches of orders for fulfillment by shoppers 208, the online system 102 may compute 415 the score for a genomic representation 510 by determining a first value and a second value. In this example, the first value is an average of the acceptance rate by shoppers 208 assigned to the control group for the corresponding genomic representation 510 and the second value is an average of the acceptance rate by shoppers 208 assigned to the test group for the corresponding genomic representation 510. Continuing with this example, the online system 102 may compute 415 the score for the genomic representation 510 as a difference between the first value and the second value. In some embodiments, the difference between the first value and the second value used to compute 415 the score for a genomic representation 510 may correspond to a cosine similarity, a Mahalanobis distance, a root-mean-square distance, or any other suitable measure of difference/distance. In embodiments in which the score is computed 415 based on a difference between values that are based on multiple metrics, the differences may be determined for multiple dimensions corresponding to the metrics. Furthermore, in embodiments in which multiple versions of the treatment are being tested, such that online system users are assigned to multiple test groups, the scoring process may be performed in an analogous manner for each test group.

In some embodiments, once the online system 102 has computed 415 the score for a genomic representation 510, it may store the score (e.g., in the score database 326). A score for a genomic representation 510 may be stored in association with various types of information (e.g., information describing and/or identifying the genomic representation 510, information indicating when the genomic representation 510 was generated 405, etc.). For subsequent generations of genomic representations 510 (described below), the score for a genomic representation 510 also or alternatively may be stored in association with information identifying one or more genomic representations 510 from which it was generated, one or more genetic operators by which it was generated, etc. For example, a score for a genomic representation 510 may be stored in association with a time at which it was generated, information describing the genes 515 included in the genomic representation 510, and information identifying a population 505 to which the genomic representation 510 belongs (e.g., the initial population 505a, the second-generation population 505b, the third-generation population 505c, etc.). As an additional example, if a genomic representation 510 is included among a population 505 of genomic representations 510 other than the initial population 505a, a score for the genomic representation 510 may be stored in association with information identifying one or more genomic representations 510 from which it was generated. In this example, the score also may be stored in association with information indicating whether the genomic representation 510 was generated by mutation, recombination, elitism, etc., as further described below.

The online system 102 then executes 420 (e.g., using the propagation engine 330) a propagation process for the initial population 505a of genetic representations 510 based on a genetic algorithm. To execute 420 the propagation process, the online system 102 identifies 425 (e.g., using the genomic representation identification engine 328) one or more genomic representations 510 from the initial population 505a of genomic representations 510 having at least a threshold score. In some embodiments, the online system 102 may identify 425 the genomic representation(s) 510 having at least the threshold score by ranking the initial population 505a of genomic representations 510 based on their scores and identifying 425 a number or percentage of highest ranked genomic representations 510. For example, the online system 102 may rank the initial population 505a of genomic representations 510 from highest to lowest based on their scores, in which the genomic representations 510 with higher scores are ranked higher than genomic representations 510 with lower scores. In this example, if there are 100 genomic representations 510 in the initial population 505a, the online system 102 may identify 425 the top 10 genomic representations 510 in the ranking or the genomic representations 510 included in the top 10% of the ranking.

In various embodiments, the online system 102 also may identify 425 the genomic representation(s) 510 by comparing the scores associated with the genomic representations 510 in the initial population 505a to the threshold score. For example, the online system 102 may identify 425 a genomic representation 510 if it is associated with a score that is equal to or greater than the threshold score and it may not identify 425 a genomic representation 510 if it is associated with a score that is less than the threshold score. In some embodiments, for subsequent generations of genomic representations 510 (described below), the threshold score may correspond to a score associated with a genomic representation 510 included in a previous generation of genomic representations 510. For example, suppose that the online system 102 has identified 425 one or more genomic representations 510 from the second-generation population 505b of genomic representations 510. In this example, the online system 102 may identify 425 a genomic representation 510 included in the second-generation population 505b if it has a score that is greater than or equal to a score associated with a genomic representation 510 included in the initial population 505a of genomic representations 510 from which it was generated.

In various embodiments, the online system 102 also may identify 425 one or more genomic representations 510 included among the initial population 505a of genomic representations 510 using other techniques. In some embodiments, the online system 102 may identify 425 the genomic representation(s) 510 based on the relative scores associated with the genomic representations 510 included in the initial population 505a. For example, the online system 102 may identify 425 one or more genomic representations 510 using a roulette wheel selection method, a stochastic universal sampling method, a tournament selection method, a rank selection method, or any other suitable technique, such that genomic representations 510 associated with higher scores are more likely to be identified 425 than genomic representations 510 associated with lower scores.

Figure 5B:
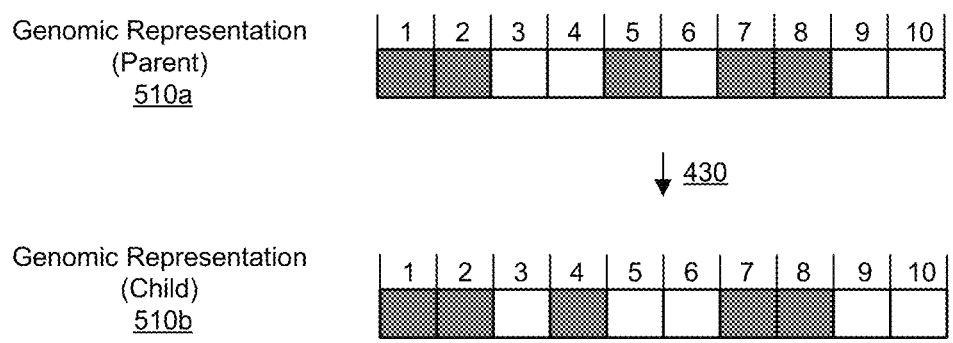
FIG. 5B illustrates an example of a mutation of a genomic representation, according to one or more embodiments.

During the propagation process executed 420 by the online system 102, the online system 102 also propagates 430 (e.g., using the propagation engine 330) one or more genes 515 included in one or more "parent" genomic representations 510 identified 425 by the online system 102 to one or more additional "child" genomic representations 510. The child genomic representation(s) 510 is/are included among a subsequent generation of genomic representations 510, such that the child genomic representation(s) 510 "inherit" the gene(s) 515 from the parent genomic representation(s) 510. One or more genes 515 included in a parent genomic representation 510 may be propagated 430 any number of times to any number of child genomic representations 510. The online system 102 may propagate 430 the gene(s) 515 via one or more genetic operators used by the genetic algorithm (e.g., mutation, recombination, elitism, etc.). In embodiments in which the online system 102 propagates 430 the gene(s) 515 via mutation, the mutation may occur via any mutation method (e.g., bit flip, swap, inversion, scramble, etc.). For example, as shown in FIG. 5B, which illustrates an example of a mutation of a genomic representation 510, according to one or more embodiments, suppose that the online system 102 identifies 425 a genomic representation 510a included in the initial population 505a of genomic representations 510. In this example, the online system 102 may propagate 430 one or more genes 515 included in this parent genomic representation 510a to a child genomic representation 510b included in the second-generation population 505b of genomic representations 510 via mutation, such that the child genomic representation 510b is generated from genes 515 of the parent genomic representation 510a by inheriting one or more genes 515 from the parent genomic representation 510a. Continuing with this example, if the mutation involves a bit flip, a unit (unit 5) within the parent genomic representation 510a that was assigned to the treatment group is now assigned to the control group in the child genomic representation 510b and another unit (unit 4) within the parent genomic representation 510a that was assigned to the control group is now assigned to the treatment group in the child genomic representation 510b, while all other genes 515 of the parent genomic representation 510a are inherited by the child genomic representation 510b. Alternatively, although not shown in FIG. 5B, in the above example, the online system 102 may propagate (step 430) genes 515 included in the parent genomic representation 510a to the child genomic representation 510b included in the second-generation population 505b of genomic representations 510 via elitism, such that the child genomic representation 510b inherits all the genes 515 from the parent genomic representation 510a.

Figure 5C:
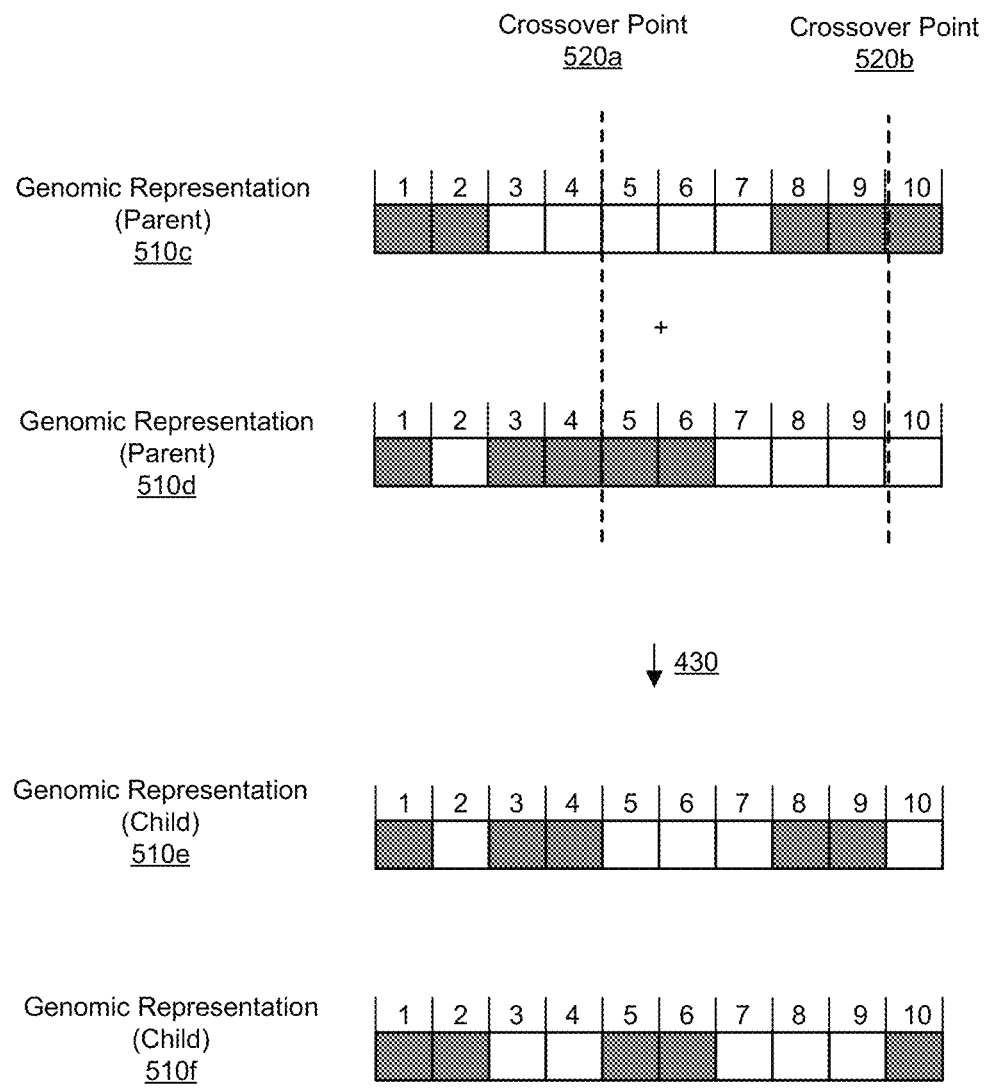
FIG. 5C illustrates an example of a recombination of genomic representations, according to one or more embodiments.

As described above, in some embodiments, the online system 102 may propagate 430 the gene(s) 515 via recombination. In such embodiments, the recombination may occur via a one-point crossover, a two-point crossover, uniform crossover, etc. For example, as shown in FIG. 5C, which illustrates an example of a recombination of genomic representations 510, according to one or more embodiments, suppose that the online system 102 identifies 425 a pair of genomic representations 510c, 510d included in the initial population 505a of genomic representations 510. In this example, the online system 102 may propagate 430 one or more genes 515 included in this pair of parent genomic representations 510c, 510d to one or more child genomic representations 510e, 510f included in the second-generation population 505b of genomic representations 510 via recombination, such that the child genomic representations 510e, 510f are generated from genes 515 of both parent genomic representations 510c, 510d by inheriting one or more genes 515 from both parent genomic representations 510c, 510d. Continuing with this example, if the recombination involves a two-point crossover, the genes 515 between the crossover points 520a, 520b of parent genomic representation 510c and the genes 515 from the crossover points 520a, 520b to the ends of parent genomic representation 510d are inherited by child genomic representation 510e. In the above example, the remainder of the genes 515 of both parent genomic representations 510c, 510d are inherited by child genomic representation 510f. Although only two parent genomic representations 510c, 510d and two child genomic representations 510e, 510f are shown in FIG. 5C, in some embodiments, a recombination may involve more parent genomic representations 510 and/or child genomic representations 510. Furthermore, although only two crossover points 520 are shown in FIG. 5C, a recombination may involve any number of crossover points 520.

Referring again to FIG. 4, the online system 102 then computes 435 (e.g., using the scoring engine 324) the score for each genomic representation 510 included among the second-generation population 505b of genomic representations 510, as described above. As also described above, in some embodiments, once the online system 102 has computed 435 the score for a genomic representation 510, it may store the score (e.g., in the score database 326). Furthermore, as described above, the score for a genomic representation 510 may be stored in association with various types of information.

The online system 102 then determines 440 (e.g., using the propagation engine 330) whether a set of stopping criteria for repeating the propagation process has been met. In some embodiments, the set of stopping criteria may be a set of default stopping criteria, while in other embodiments, the set of stopping criteria may be specified for repeating the propagation process prior to or during execution 420 of the propagation process. The online system 102 may determine 440 whether the set of stopping criteria has been met by accessing the set of stopping criteria (e.g. from the stopping criteria database 332) and comparing the set of stopping criteria to a current set of conditions. In various embodiments, the stopping criteria may include a predetermined number of genomic representations 510 or populations 505 of genomic representations 510, a predetermined time interval, a quality metric, and/or any other suitable criteria. For example, the stopping criteria may include 50 generations or populations 505 of genomic representations 510, such that when 50 generations or populations 505 of genomic representations 510 have been generated, this criterium has been met. In the above example, if the stopping criteria also includes a predetermined time interval of two hours, this criterium is met two hours from a starting time (e.g., when the initial population 505a of genomic representations 510 is generated 405). The set of stopping criteria may be stored in association with various types of information (e.g., information identifying one or more populations 505 of genomic representations 510 associated with the set of stopping criteria, a set of rules describing when the set of criteria is met, etc.). In embodiments in which the set of stopping criteria is stored in association with a set of rules, the online system 102 also may determine 440 whether the set of stopping criteria has been met based on the set of rules. In the above example, if the set of stopping criteria is stored in association with a set of rules indicating that the set of stopping criteria is met when any of the criteria are met, the online system 102 may determine 440 that the set of stopping criteria is met when 50 generations or populations 505 of genomic representations 510 have been generated or two hours from the starting time, whichever occurs first. In embodiments in which the set of stopping criteria includes a quality metric, the quality metric may be based on a score associated with a genomic representation 510. For example, the quality metric may correspond to a highest score associated with a genomic representation 510 out of 1,000,000 genomic representations 510.

If the online system 102 determines 440 that the set of stopping criteria has not been met, the online system 102 repeats (e.g., using the propagation engine 330) execution 420 of the propagation process for each subsequent generation of genomic representations 510 until the set of stopping criteria has been met. For example, as shown in FIG. 5A, once the second-generation population 505b of genomic representations 510 has been generated, the propagation process may be repeated to generate the third-generation population 505c of genomic representations 510, etc., until the online system 102 determines 440 that the set of stopping criteria has been met. In this example, the Nth-generation population 505n of genomic representations 510 is the last population 505 of genomic representations 510 generated by the propagation process before the online system 102 determines 440 that the set of stopping criteria has been met.

Referring once more to FIG. 4, once the online system 102 determines 440 that the set of stopping criteria has been met, the online system 102 selects 445 (e.g., using the genomic representation identification engine 328) a genomic representation 510 from one or more populations 505 of genomic representations 510 (e.g., the initial population 505a, the second-generation population 505b, the third-generation population 505c, etc.). The online system 102 may do so based on one or more scores associated with one or more genomic representations 510. In some embodiments, the genomic representation 510 selected 445 by the online system 102 is associated with a highest score. For example, the online system 102 may select 445 the genomic representation 510 associated with the highest score from the initial population 505a of genomic representations 510 and every population 505 of genomic representations 510 (e.g., the second-generation population 505b, the third-generation population 505c, etc.) subsequently generated from the initial population 505a. Alternatively, in the above example, if the online system 102 uses a genetic operator (e.g., elitism) to propagate 430 all genes 515 from genomic representations 510 associated with at least a threshold score to a subsequent generation of genomic representations 510, the online system 102 may select 445 the genomic representation 510 associated with the highest score from the population 505 of genomic representations 510 that was generated last. The online system 102 may select 445 the genomic representation 510 using various techniques. For example, the online system 102 may rank the scores associated with genomic representations 510 included among one or more populations 505 of genomic representations 510 and select 445 the genomic representation 510 associated with the highest score based on the ranking. As an additional example, the online system 102 may compare different pairs of genomic representations 510 included among one or more populations 505 of genomic representations 510 based on their scores, select the genomic representation 510 of each pair having the higher score, and continue to compare pairs of selected genomic representations 510 until the genomic representation 510 associated with the highest score is selected 445.

Once the online system 102 has selected 445 the genomic representation 510, the online system 102 may assign (step 450, e.g., using the testing engine 334) users of the online system 102 to the control and test groups for performing the test (e.g., an A/B test) based on the genomic representation 510 that was selected 445. For example, if each gene 515 included in the genomic representation 510 selected 445 by the online system 102 corresponds to users of the online system 102 in a market (e.g., a zip code, a city, a region, a state, a country, etc.) assigned to the test group or the control group, the online system 102 may assign 450 the users in each market to a group indicated by the selected genomic representation. Alternatively, in the above example, if each gene 515 included in the selected genomic representation 510 corresponds to a user of the online system 102 assigned to the test group or the control group, the online system 102 may assign 450 each user to a group indicated by the genomic representation 510.

The online system 102 may then perform 455 (e.g., using the testing engine 334) the test (e.g., an A/B test) based on the assignment. To perform 455 the test, the online system 102 applies the treatment to the test group, but not the control group. For example, if the treatment corresponds to different costs charged to customers 204, a new cost is applied to customers 204 assigned to the treatment group but not to customers 204 assigned to the control group, such that customers 204 in the treatment group are charged the new cost and customers 204 in the control group are charged the original cost. In this example, effects of the treatment and the absence of the treatment may be measured as the average rates orders are placed by customers 204 in the test group and the control group, respectively. Alternatively, in the above example, if multiple versions of the treatment are being tested, different versions of the treatment are applied to different test groups and the effects of each version of the treatment is measured as the average rate orders are placed by customers 204 in the corresponding test group.

In some embodiments, the online system 102 also may analyze 460 (e.g., using the analysis engine 336) a result of performing 455 the test (e.g., an A/B test) based on the assignment of online system users to the control and test groups. In such embodiments, the online system 102 may analyze 460 the result using one or more tests/techniques, such as a permutation test, a bootstrap test, a difference-in-differences technique, or any other suitable tests or techniques. For example, the online system 102 may analyze 460 a result of an A/B test to estimate the population distribution for the test using a permutation test and/or a bootstrap test. As an additional example, the online system 102 may use a difference-in-differences technique to identify significant differences in the outcome of the test (e.g., an A/B test) for treatment and control groups in the test. Once the online system 102 has analyzed 460 the result of performing 455 the test, various decisions may be made, such as whether the test results were reliable, whether to enact new policies based on the test results, whether to continue testing, whether to retest the treatment (e.g., at the user level or at a different market level), etc.

Additional Considerations

The foregoing description of the embodiments of the invention has been presented for the purpose of illustration; it is not intended to be exhaustive or to limit the invention to the precise forms disclosed. Many modifications and variations are possible in light of the above disclosure.

Some portions of this description describe the embodiments of the invention in terms of algorithms and symbolic representations of operations on information. These algorithmic descriptions and representations are commonly used in the data processing arts to convey the substance of their work effectively to others. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    generating a set of genomic representations at an online system, wherein a genomic representation comprises a plurality of genes and each gene represents one or more users of the online system assigned to a control group or a test group for performing an A/B test for a treatment associated with the test group, wherein the treatment comprises a set of new variables being tested for use by the online system for a user interface of a mobile application;
    identifying a metric associated with a set of users of the online system based at least in part on the treatment associated with the test group;
    computing a score for each genomic representation of the set of genomic representations based at least in part on a difference between a first value and a second value, wherein the first value is based on the metric associated with a first set of users of the online system assigned to the test group for a corresponding genomic representation and the second value is based on the metric associated with a second set of users of the online system assigned to the control group for the corresponding genomic representation;
    executing a propagation process for the set of genomic representations based at least in part on a genetic algorithm, wherein executing the propagation process comprises:
        identifying one or more genomic representations having at least a threshold score,
        propagating one or more genes included in the one or more genomic representations to one or more additional genomic representations included among an additional set of genomic representations through one or more of: a recombination and a mutation, and
        computing the score for each genomic representation included among the additional set of genomic representations;
    repeating the propagation process for each additional set of genomic representations until a set of stopping criteria has been met;
    selecting a genomic representation from the set of genomic representations and each additional set of genomic representations based at least in part on one or more scores associated with one or more genomic representations included among the set of genomic representations and each additional set of genomic representations;
    assigning a first plurality of users of the online system to the control group and a second plurality of users of the online system to the test group for performing the A/B test based at least in part on the selected genomic representation; and
    performing the A/B test based on the assigning, wherein performing the A/B test comprises:
        presenting a first user interface of the mobile application to the first plurality of users assigned to the control group, wherein the first user interface is presented according to an original set of variables, and
        presenting a second user interface of the mobile application to the second plurality of users assigned to the test group, wherein the second user interface is presented according to the new set of variables.

2. The method of claim 1, wherein the set of stopping criteria comprises one or more of: a predetermined number of genomic representations, a predetermined number of sets of genomic representations, a predetermined time interval, and a quality metric.

3. The method of claim 2, wherein the quality metric is based at least in part on the score associated with the selected genomic representation.

4. The method of claim 1, wherein each gene corresponds to one or more users of the online system associated with a geographic location.

5. The method of claim 4, wherein the geographic location is selected from a group consisting of: a neighborhood, a zip code, a city, a county, a state, a region, a country, or a continent.

6. The method of claim 1, wherein the set of genomic representations is generated using a random sampling technique selected from a group consisting of: simple random sampling or stratified random sampling.

7. The method of claim 1, further comprising:
    analyzing a result of performing the A/B test based on the assigning using one or more selected from a group consisting of: a permutation test, a bootstrap test, or a difference-in-differences technique.

8. The method of claim 1, wherein the difference between the first value and the second value is selected from a group consisting of: a cosine similarity, a Mahalanobis distance, or a root-mean-square distance.

9. A computer program product comprising a non-transitory computer readable storage medium having instructions encoded thereon that, when executed by a processor, cause the processor to:
    generate a set of genomic representations at an online system, wherein a genomic representation comprises a plurality of genes and each gene represents one or more users of the online system assigned to a control group or a test group for performing an A/B test for a treatment associated with the test group, wherein the treatment comprises a set of new variables being tested for use by the online system for a user interface of a mobile application;
    identify a metric associated with a set of users of the online system based at least in part on the treatment associated with the test group;
    compute a score for each genomic representation of the set of genomic representations based at least in part on a difference between a first value and a second value, wherein the first value is based on the metric associated with a first set of users of the online system assigned to the test group for a corresponding genomic representation and the second value is based on the metric associated with a second set of users of the online system assigned to the control group for the corresponding genomic representation;
execute a propagation process for the set of genomic representations based at least in part on a genetic algorithm, wherein execute the propagation process comprises:
identify one or more genomic representations having at least a threshold score, propagate one or more genes included in the one or more genomic representations to one or more additional genomic representations included among an additional set of genomic representations through one or more of: a recombination and a mutation, and
compute the score for each genomic representation included among the additional set of genomic representations;
repeat the propagation process for each additional set of genomic representations until a set of stopping criteria has been met;
select a genomic representation from the set of genomic representations and each additional set of genomic representations based at least in part on one or more scores associated with one or more genomic representations included among the set of genomic representations and each additional set of genomic representations;
assign a first plurality of users of the online system to the control group and a second plurality of users of the online system to the test group for performing the A/B test based at least in part on the selected genomic representation; and
perform the A/B test based on the assigning, wherein performing the A/B test comprises:
presenting a first user interface of the mobile application to the first plurality of users assigned to the control group, wherein the first user interface is presented according to an original set of variables, and
presenting a second user interface of the mobile application to the second plurality of users assigned to the test group, wherein the second user interface is presented according to the new set of variables.

10. The computer program product of claim 9, wherein the set of stopping criteria comprises one or more of: a predetermined number of genomic representations, a predetermined number of sets of genomic representations, a predetermined time interval, and a quality metric.

11. The computer program product of claim 10, wherein the quality metric is based at least in part on the score associated with the selected genomic representation.

12. The computer program product of claim 9, wherein each gene corresponds to one or more users of the online system associated with a geographic location.

13. The computer program product of claim 12, wherein the geographic location is selected from a group consisting of: a neighborhood, a zip code, a city, a county, a state, a region, a country, or a continent.

14. The computer program product of claim 9, wherein the set of genomic representations is generated using a random sampling technique selected from a group consisting of: simple random sampling or stratified random sampling.

15. The computer program product of claim 9, wherein the computer-readable storage medium further has instructions encoded thereon that, when executed by the processor, cause the processor to:
analyze a result of performing the A/B test based on the assigning using one or more selected from a group consisting of: a permutation test, a bootstrap test, or a difference-in-differences technique.

16. The computer program product of claim 9, wherein the difference between the first value and the second value is selected from a group consisting of: a cosine similarity, a Mahalanobis distance, or a root-mean-square distance.

17. A computer system comprising:
a processor; and
a non-transitory computer readable storage medium storing instructions that, when executed by the processor, perform actions comprising:
generating a set of genomic representations at an online system, wherein a genomic representation comprises a plurality of genes and each gene represents one or more users of the online system assigned to a control group or a test group for performing an A/B test for a treatment associated with the test group, wherein the treatment comprises a set of new variables being tested for use by the online system for a user interface of a mobile application;
identifying a metric associated with a set of users of the online system based at least in part on a treatment associated with the test group;
computing a score for each genomic representation of the set of genomic representations based at least in part on a difference between a first value and a second value, wherein the first value is based on the metric associated with a first set of users of the online system assigned to the test group for a corresponding genomic representation and the second value is based on the metric associated with a second set of users of the online system assigned to the control group for the corresponding genomic representation;
executing a propagation process for the set of genomic representations based at least in part on a genetic algorithm, wherein executing the propagation process comprises:
identifying one or more genomic representations having at least a threshold score,
propagating one or more genes included in the one or more genomic representations to one or more additional genomic representations included among an additional set of genomic representations through one or more of: a recombination and a mutation, and
computing the score for each genomic representation included among the additional set of genomic representations;
repeating the propagation process for each additional set of genomic representations until a set of stopping criteria has been met;
selecting a genomic representation from the set of genomic representations and each additional set of genomic representations based at least in part on one or more scores associated with one or more genomic representations included among the set of genomic representations and each additional set of genomic representations;
assigning a first plurality of users of the online system to the control group and a second plurality of users of the online system to the test group for performing the A/B test based at least in part on the selected genomic representation; and
performing the A/B test based on the assigning, wherein performing the A/B test comprises:
presenting a first user interface of the mobile application to the first plurality of users assigned to the control group, wherein the first user interface is presented according to an original set of variables, and presenting a second user interface of the mobile application to the second plurality of users assigned to the test group, wherein the second user interface is presented according to the new set of variables.

18. The computer system of claim 17, wherein the set of stopping criteria comprises one or more of: a predetermined number of genomic representations, a predetermined number of sets of genomic representations, a predetermined time interval, and a quality metric.

19. The computer system of claim 17, wherein each gene corresponds to one or more users of the online system associated with a geographic location.

20. The computer system of claim 19, wherein the geographic location is selected from a group consisting of: a neighborhood, a zip code, a city, a county, a state, a region, a country, or a continent.

* * * * *